(12) United States Patent
Tai et al.

(10) Patent No.: US 8,421,926 B1
(45) Date of Patent: Apr. 16, 2013

(54) DEVICE FOR OUTPUTTING LUMINANCE SIGNAL

(75) Inventors: Albert Hua Tai, Hsinchu (TW); Feng Chi Wei, Hsinchu (TW); Heng Yi Liu, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 59 days.

(21) Appl. No.: 13/290,040

(22) Filed: Nov. 4, 2011

(51) Int. Cl.
*H04N 9/78* (2006.01)

(52) U.S. Cl.
USPC ......... 348/665; 348/663; 348/396.1; 348/609

(58) Field of Classification Search .......... 348/662–667, 348/234–238, 396.1, 489.493, 609, 631, 348/702
See application file for complete search history.

(56) References Cited

U.S. PATENT DOCUMENTS

| | | | |
|---|---|---|---|
| 2005/0134745 A1* | 6/2005 | Bacche et al. | 348/702 |
| 2007/0153127 A1* | 7/2007 | MacInnis et al. | 348/667 |
| 2009/0040388 A1* | 2/2009 | Hong | 348/665 |
| 2010/0188571 A1* | 7/2010 | Wei Yin | 348/453 |

\* cited by examiner

*Primary Examiner* — Jefferey Harold
*Assistant Examiner* — Samira Monshi

(57) ABSTRACT

A device for outputting a luminance signal is disclosed. The device includes a chrominance judgment unit, a field observation unit, and an output unit. The chrominance judgment unit and the field observation unit are used to determine whether a 3D luminance signal is affected. The output unit outputs a resultant luminance signal according to the determination results of the chrominance judgment unit and the field observation unit. According to the present invention, the resultant luminance signal can be accurately obtained by judging characteristics of the 3D luminance signal and a 3D chrominance signal even if a 3D comb filter is wrongly used in a motion condition.

18 Claims, 3 Drawing Sheets

DEVICE FOR OUTPUTTING LUMINANCE SIGNAL

TECHNICAL FIELD OF THE INVENTION

The present invention relates to a device, more particularly, to a device for outputting a luminance signal.

BACKGROUND OF THE INVENTION

A composite video signal comprises a luminance signal (Y) and a chrominance signal (C). A comb filter is commonly used to separate the luminance signal and the chrominance signal from the composite video signal. The process of separating the luminance signal and the chrominance signal is referred to as a Y/C separation.

There are three types of comb filters used to separate the composite video signal. The three types of comb filters are classified into a one-dimensional (1D) comb filter, a two-dimensional (2D) comb filter and a three-dimensional (3D) comb filter. The 1D comb filter and the 2D comb filter are referred to as a type of non-3D comb filter. In general, the non-3D comb filter is used to separate the luminance signal and the chrominance signal when an image is under a motion condition, and the 3D comb filter is used to separate the luminance signal and the chrominance signal when the image is under a static condition.

However, it is difficult to make a precise judgment between the motion condition and the static condition. When the image is under the motion condition and the 3D comb filter is wrongly used to separate the luminance signal and the chrominance signal, a mesh-like image appears due to the effect of the chrominance signal on the luminance signal. That is, the luminance signal is affected by the chrominance signal.

Therefore, there is a need for a solution to avoid the problem that the luminance signal is affected by the chrominance signal when the 3D comb filter is wrongly used under the motion condition.

SUMMARY OF THE INVENTION

An objective of the present invention is to provide a device for outputting a luminance signal.

In accordance with an aspect of the present invention, a device for outputting a luminance in an image processing system comprises a chrominance judgment unit, a field observation unit, and an output unit. A composite video signal of a frame has a chrominance component and a luminance component. A 3D comb filter receives the composite video signal of the frame and outputs a 3D luminance signal based on the luminance component. The chrominance component is modulated onto a carrier frequency. The chrominance judgment unit comprises a luminance detection unit and a chrominance motion detection unit. The luminance detection unit judges whether a difference value between an amplitude of the 3D luminance signal and an amplitude of the 3D luminance signal within a frequency range with respect to the carrier frequency of the chrominance component is lower than a first threshold value. The chrominance motion detection unit judges whether a chrominance change between two 3D chrominance signals is greater than a second threshold value. The field observation unit comprises a value comparison unit and an edge area detection unit. The value comparison unit judges whether a difference value between a maximum value in an N-point cycle of a first field and a maximum value in an N-point cycle of a third field or a difference value between a minimum value in the N-point cycle of the first field and a minimum value in the N-point cycle of the third field is greater than a third threshold value, wherein N is a positive integer. The edge area detection unit judges whether the first field is in an edge of the frame. The output unit outputs the 3D luminance signal, of which a component within the frequency range with respect to the carrier frequency of the chrominance component is notch filtered, when the judgment results of the luminance detection unit and the chrominance motion detection unit are true. The output unit outputs the 3D luminance signal, of which the component within the frequency range with respect to the carrier frequency of the chrominance component is notch filtered, when at least one of the difference value of the maximum values and the difference value of the minimum values in the N-point cycles of the first and third fields is greater than the third threshold value, and a detection result of the edge area detection unit is false. Otherwise, the output unit outputs the 3D luminance signal.

BRIEF DESCRIPTION OF THE DRAWINGS

The present invention will be described in detail in conjunction with the appending drawings, in which.

DETAILED DESCRIPTION OF THE INVENTION

Figure 1:
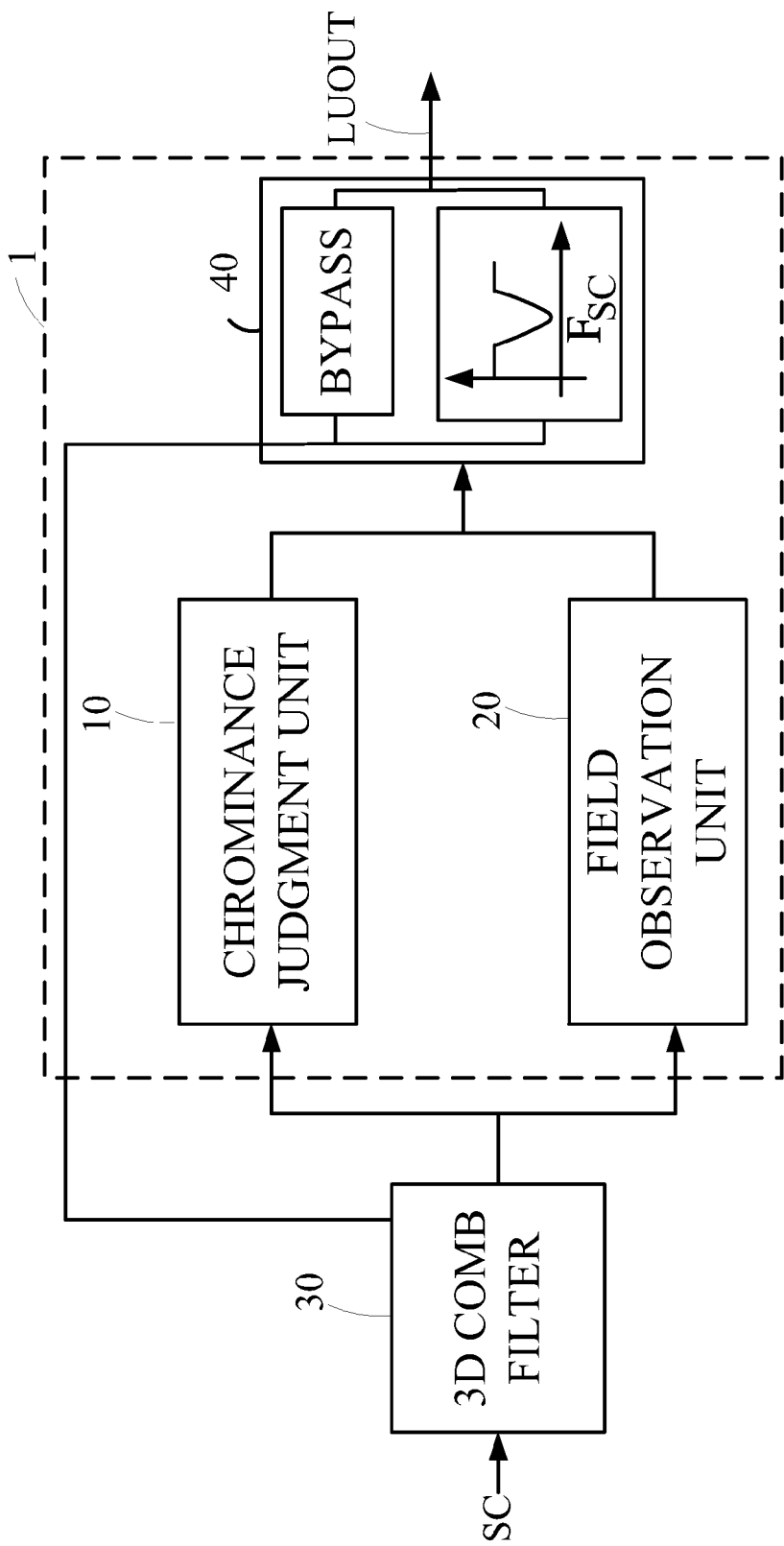
FIG. 1 is a schematic diagram showing an image processing system has a device for outputting a luminance signal according to an embodiment of the present invention.

FIG. 1 is a schematic diagram showing an image processing system has a device 1 for outputting a luminance signal according to an embodiment of the present invention. The image processing system comprises a 3D comb filter 30 and the device 1. The 3D comb filter 30 receives a composite video SC of a frame. The composite video signal SC has a luminance component and a chrominance component which is modulated onto a carrier frequency. A 3D chrominance signal and a 3D luminance signal are extracted from the composite video signal SC by the 3D comb filter 30. In the prior arts, the 3D chrominance signal and the 3D luminance signal from the 3D comb filter 30 are directly served as an output chrominance signal and an output luminance signal. However, when the 3D comb filter 30 is wrongly used in a motion condition, the 3D chrominance signal and the 3D luminance signal may be incorrect. The device 1 according to the present invention judges characteristics of the 3D chrominance signal and the 3D luminance signal to generate an output luminance signal LUOUT which is not affected by the 3D chrominance signal. In summary, the output luminance signal in the prior arts is the 3D luminance signal which is outputted by the 3D comb filter 30, and the output luminance signal LUOUT of the present invention is outputted by the device 1 after the device 1 judges the characteristics of the 3D luminance signal and the 3D chrominance signal. That is, the device 1 according to the present invention is capable of eliminating the effect of the 3D chrominance signal on the 3D luminance signal even if the 3D comb filter 30 is wrongly used under a motion condition. The device 1 comprises a chrominance judgment unit 10, a field observation unit 20, and an output unit 40.

Figure 2:
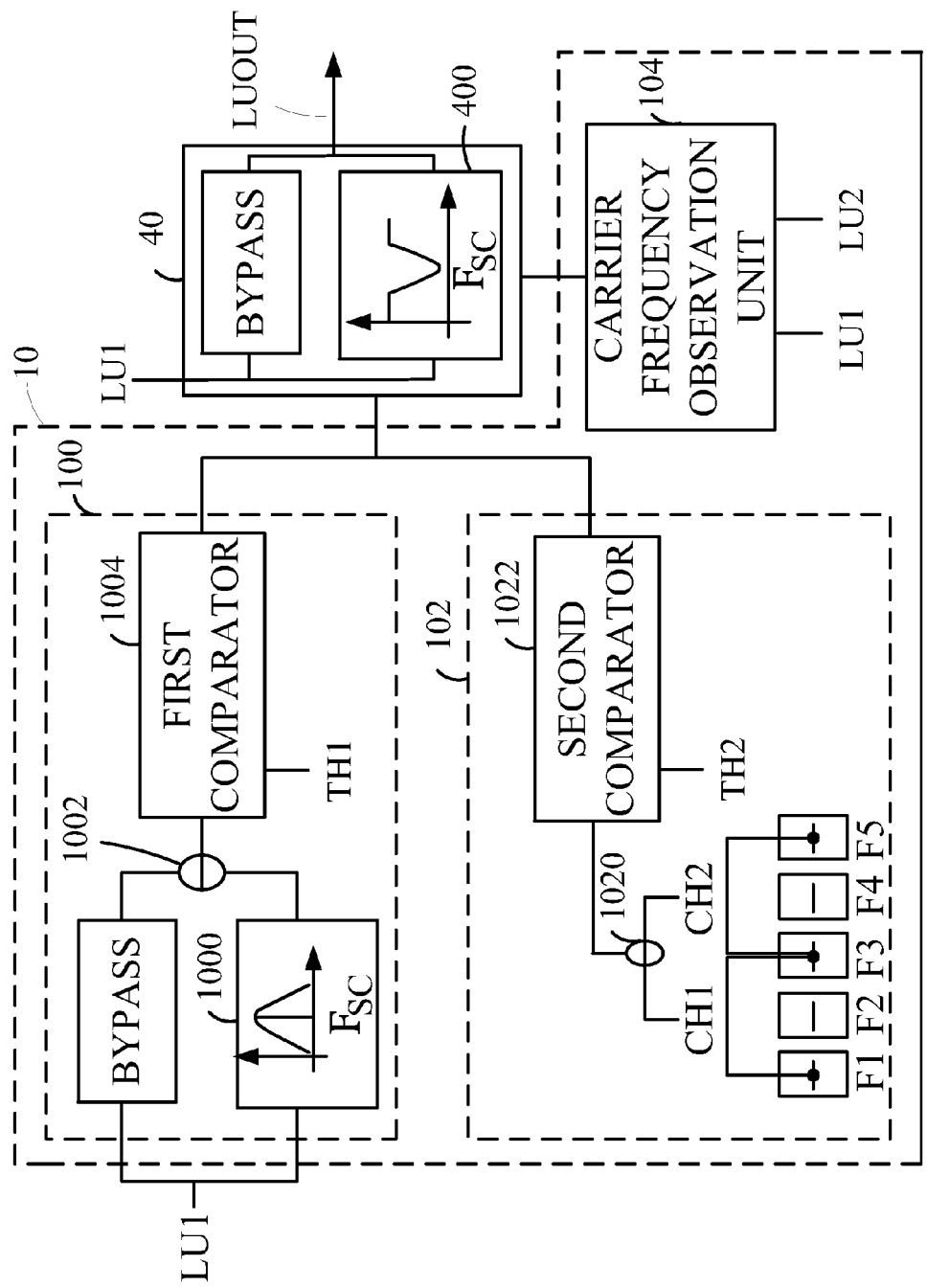
FIG. 2 is a schematic diagram showing the chrominance judgment unit in FIG. 1.

FIG. 2 is a schematic diagram showing the chrominance judgment unit 10 in FIG. 1. The chrominance judgment unit 10 comprises a luminance detection unit 100, a chrominance motion detection unit 102, and a carrier frequency observation unit 104. The luminance detection unit 100 is used to judge whether a difference value between an amplitude of the 3D luminance signal LU1 and an amplitude of the 3D luminance signal LU1 within a frequency range with respect to the carrier frequency Fsc of the chrominance component is lower than a first threshold value. The luminance detection unit 100 comprises a band pass filter 1000, a first subtractor 1002, and a first comparator 1004. The 3D luminance signal LU1 from the 3D comb filter 30 in FIG. 1 is bypassed (i.e. without being processed) to the first subtractor 1002 and inputted to the band pass filter 1000. The band pass filter 1000 passes a component within the frequency range with respect to the carrier frequency Fsc of the chrominance component. Then, a subtraction of the output of the band pass filter 1000 and the 3D luminance signal LU1 is performed by the first subtractor 1002, and the first comparator 1004 compares the subtraction result of the first subtractor 1002 with a first threshold value TH1. When the subtraction result of the first subtractor 1004 is lower than the first threshold value TH1, it means that the frequency of the 3D luminance signal LU1 is near the carrier frequency $F_{SC}$ of the chrominance component and thus the luminance component of the composite video signal SC in FIG. 1 is likely to be affected by the chrominance component of the composite video signal SC in FIG. 1. When the subtraction result of the first subtractor 1004 is greater than the first threshold value TH1, it means that the frequency of the 3D luminance signal LU1 is not near the carrier frequency Fsc of the chrominance component.

The chrominance motion detection unit 102 is used to judge whether a chrominance change between a first 3D chrominance signal CH1 and a second 3D chrominance signal CH2. The first 3D chrominance signal CH1 is obtained from a first field F1 and a third field F3, and the second 3D chrominance signal CH2 is obtained from the third field F3 and a fifth field F5. That is, each of the first 3D chrominance signal CH1 and the second 3D chrominance signal CH2 is obtained between two continuously frames since one frame includes two fields. It is noted that the first field F1, the third field F3, and the fifth field F5 may be National Television System Committee (NTSC) standard or Phase Alternation by Line (PAL) standard. Then, a subtraction of the first 3D chrominance signal CH1 and the second 3D chrominance signal CH2 is performed by a second subtractor 1020. Finally, a second comparator 1022 compares the subtraction result of the second subtractor 1020 with a second threshold value TH2. When the subtraction result of the second subtractor 1020 is greater than the second threshold value TH2, it means that the frame is motional and thus crosstalk between the chrominance component and the luminance component of the composite video signal SC in FIG. 1 occurs.

The carrier frequency observation unit 104 is used to judge whether two 3D luminance signals LU1 and LU2 have a phase difference of 180 degrees. When the phase difference between the two 3D luminance signals LU1 which is referred as a current scan line and LU2 which is referred as a next scan line is 180 degrees, it represents that the 3D luminance signal LU1 is likely to have characteristics of the 3D chrominance signal. It is noted that the carrier frequency observation unit 104 is optional in the chrominance judgment unit 10.

When the comparison result between the subtraction result of the first subtractor 1002 and the first threshold value is true (i.e. the subtraction result of the first subtractor 1002 is lower than the first threshold value), the comparison result between the subtraction result of the second subtractor 1020 and the second threshold value is true (i.e. the subtraction result of the second subtractor 1020 is greater than the second threshold value), and the judged result of the carrier frequency observation unit 104 is true (i.e. the 3D luminance signals LU1, LU2 have the phase difference of 180 degrees), it represents that the effect of the chrominance signal occurs, that is, the 3D luminance signal LU1 is affected. As a result, the output unit 40 outputs the 3D luminance signal LU1, of which the portion within the frequency range with respect to the carrier frequency of the chrominance component is notch filtered by a first notch filter 400 to eliminate the effect of the 3D chrominance signal. When the comparison result of the first comparator 1004 is false (i.e. the subtraction result is not lower than the first threshold value), the comparison result of the second comparator is false (i.e. the subtraction result is not greater than the second threshold value) is false, or the judged result of the carrier frequency observation unit 104 is false (i.e. the 3D luminance signals LU1, LU2 do not have the phase difference of 180 degrees), it represents that the effect of the 3D chrominance signal does not occur and the output unit 40 outputs the 3D luminance signal LU1. The above-mentioned frequency range with respect to the carrier frequency Fsc is adjustable as required.

Figure 3:
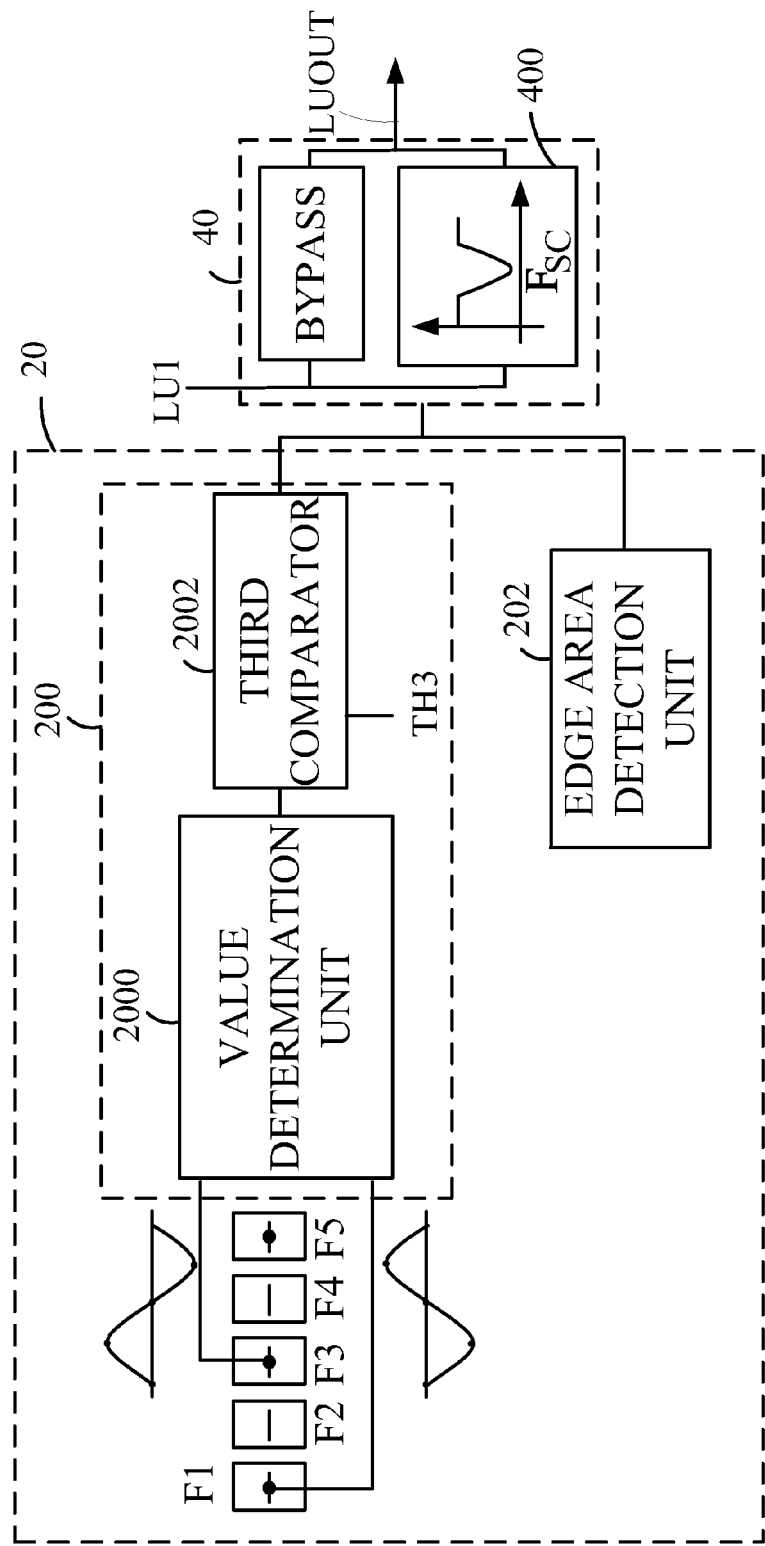
FIG. 3 is a schematic diagram showing the field observation unit in FIG. 1.

FIG. 3 is a schematic diagram showing the field observation unit 20 in FIG. 1. The field observation unit 20 is used to observe a 3D chrominance change between the first and third fields F1 and F3. As is known to one skilled in the same art of the present invention, a sampling frequency of the 3D comb filter 30 in FIG. 1 is commonly set as N×Fsc, wherein N is a positive integer and Fsc is the carrier frequency of the chrominance component of the composite video signal SC in FIG. 1. For example, when N is equal to four, a cycle of a 3D chrominance signal includes N points each having a phase of 0 degree, 90 degrees, 180 degrees, or 270 degrees. When N is equal to eight, a cycle of a 3D chrominance signal includes N points each having a phase of 0 degree, 45 degrees, 90 degrees, 135 degrees, 180 degrees, 225 degrees, 270 degrees, or 315 degrees. The field observation unit 20 comprises a value comparison unit 200 and an edge area detection unit 202. The value comparison unit 200 is used to judge whether a difference value between a maximum value in the N-point cycle of the first field F1 and a maximum value in the N-point cycle of the third field F3 is greater than a third threshold value TH3, or whether a difference value between a minimum value in the N-point cycle of the first field F1 and a minimum value in the N-point cycle of the third field F3 is greater than the threshold value TH3. The value comparison unit 200 comprises a value determination unit 2000 and a third comparator 2002. The value determination unit 2000 determines the maximum or minimum values in the N-point cycle of the first field F1 and the maximum or minimum values in the N-point cycle of the third field F3. Then, the value determination unit 2000 determines a difference value between the maximum values in the N-point cycles of the first and third fields F1, F3 and a difference value between the minimum values in the N-point cycles of the first and third field F1, F3. The third comparator 2002 compares the difference value of the maximum values in the N-point cycles of the first and third field F1, F3 with the third threshold value TH3, or compares the difference value of the minimum values in the N-point cycles of the first and third field F1, F3 with the third threshold value TH3. The edge area detection unit 202 is used to judge whether the first field F1 is in an edge of the frame. When the first field F1 is in the edge of the frame, an erroneous judgment occurs. Accordingly, the condition that the first field F1 in the edge of the frame should be excluded. When at least one of the difference value of the maximum values and the difference value of the minimum values in the N-point cycles of the first and third field F1, F3 is greater than the third threshold value TH3, and the detection result of the edge area detection unit 202 is false (i.e. the first field F1 is not in the edge of the frame), it means that the 3D luminance signal LU1 includes the effect of the 3D chrominance signal. Therefore, the output unit 40 outputs the 3D luminance signal LU1, of which the component within the frequency range with respect to the carrier frequency Fsc of the chrominance component is notch filtered by the notch filter 400.

As mentioned above, the 3D comb filter 30 in FIG. 1 should be used in a static condition and a non-3D comb filter should be used in a motion condition. When the 3D comb filter 30 or the non-3D comb filter is used in a wrong condition, the crosstalk between the luminance signal and the chrominance signal occurs. The present invention is capable of obtaining the accurate output luminance signal LUOUT by judging the characteristics of the 3D luminance signal and the 3D chrominance signal. As a result, the effect of the 3D chrominance signal can be eliminated even if the 3D comb filter 30 in FIG. 1 is wrongly used in the motion condition.

In the present embodiment, each of the chrominance judgment unit 10 and the field observation unit 20 can eliminate the effect of the 3D chrominance signal. The device 1 according to the present invention can be set to select one of the chrominance judgment unit 10 and the field observation unit 20 to obtain the accurate output luminance signal LUOUT. In another embodiment, the device 1 can include only one of the chrominance judgment unit 10 and the field observation unit 20 to obtain the accurate output luminance signal LUOUT.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A device for outputting a luminance signal in an image processing system, a composite video signal of a frame having a chrominance component and a luminance component, wherein a 3D (three dimensional) comb filter receiving the composite video signal of the frame and outputting a 3D luminance signal based on the luminance component, and wherein the chrominance component being modulated onto a carrier frequency, the device comprising:
    a chrominance judgment unit, comprising:
        a luminance detection unit, judging whether a difference value between an amplitude of the 3D luminance signal and the amplitude of the 3D luminance signal within a frequency range with respect to the carrier frequency of the chrominance component is lower than a first threshold value; and
        a chrominance motion detection unit, judging whether a chrominance change between two 3D chrominance signals is greater than a second threshold value;
    a field observation unit, comprising:
        a value comparison unit, judging whether a difference value between a maximum value in an N-point cycle of a first field and a maximum value in an N-point cycle of a third field or a difference value between a minimum value in the N-point cycle of the first field and a minimum value in the N-point cycle of the third field is greater than a third threshold value, wherein N is a positive integer; and
        an edge area detection unit, judging whether the first field is in an edge of the frame; and
    an output unit, wherein the output unit outputs the 3D luminance signal, of which a component within the frequency range with respect to the carrier frequency of the chrominance component is notch filtered, when the judgment results of the luminance detection unit and the chrominance motion detection unit are true;
    the output unit outputs the 3D luminance signal, of which the component within the frequency range with respect to the carrier frequency of the chrominance component is notch filtered, when at least one of the difference value of the maximum values and the difference value of the minimum values in the N-point cycles of the first and third fields is greater than the third threshold value, and a detection result of the edge area detection unit is false; otherwise, the output unit outputs the 3D luminance signal.

2. The device of claim 1, wherein the luminance detection unit comprises:
    a band pass filter, passing the component within the frequency range with respect to the carrier frequency of the chrominance component;
    a first subtractor, performing a subtraction of the output of the band pass filter and the 3D luminance signal; and
    a first comparator, comparing the subtraction result of the first subtractor with the first threshold value.

3. The device of claim 1, wherein the chrominance motion detection unit comprises:
    a second subtractor, performing a subtraction of the two 3D chrominance signals; and
    a second comparator, comparing the subtraction result of the second subtractor with the second threshold value.

4. The device of claim 3, wherein one of the two 3D chrominance signals is obtained from the first field and the third field, and the other one of the two 3D chrominance signals is obtained from the third field and a fifth field.

5. The device of claim 4, wherein the first field, the third field, and the fifth field are NTSC standard or PAL standard.

6. The device of claim 1, wherein the chrominance judgment unit further comprises a carrier frequency observation unit for judging whether the 3D luminance signal and a next 3D luminance signal have a phase difference of 180 degrees.

7. The device of claim 1, wherein the value comparison unit comprises:
    a value determination unit, determining the difference value between the maximum value in the N-point cycle of the first field and the maximum value in the N-point cycle of the third field and the difference value between the minimum value in the N-point cycle of the first field and minimum value in the N-point cycle of the third field; and
    a third comparator, comparing the difference value of the maximum value in the N-point cycle of the first field and the maximum value in the N-point cycle of the third field with the third threshold value and the difference value of the minimum value in the N-point cycle of the first field and the minimum value in the N-point cycle of the third field with the third threshold value.

8. The device of claim 1, wherein the frequency range with respect to the carrier frequency of the chrominance component is adjustable.

9. A device for outputting a luminance signal in an image processing system, a composite video signal of a frame having a chrominance component and a luminance component, wherein a 3D (three dimensional) comb filter receiving the composite video signal of the frame and outputting a 3D luminance signal based on the luminance component, and wherein the chrominance component being modulated onto a carrier frequency, the device comprising:
a chrominance judgment unit, comprising:
a luminance detection unit, judging whether a difference value between an amplitude of the 3D luminance signal and the amplitude of the 3D luminance signal within a frequency range with respect to the carrier frequency of the chrominance component is lower than a first threshold value; and
a chrominance motion detection unit, judging whether a chrominance change between two 3D chrominance signals is greater than a second threshold value; and
an output unit, outputting the 3D luminance signal, of which a component within the frequency range with respect to the carrier frequency of the chrominance component is notch filtered, when the judgment results of the luminance detection unit and the chrominance motion detection unit are true, or outputting the 3D luminance signal when one of the judgment results of the luminance detection unit and the chrominance motion detection unit is false.

10. The device of claim 9, wherein the luminance detection unit comprises:
a band pass filter, passing the component within the frequency range with respect to the carrier frequency of the chrominance component;
a first subtractor, performing a subtraction of the output of the band pass filter and the 3D luminance signal; and
a first comparator, comparing the subtraction result of the first subtractor with the first threshold value.

11. The device of claim 9, wherein the chrominance motion detection unit comprises:
a second subtractor, performing a subtraction of the two 3D chrominance signals; and
a second comparator, comparing the subtraction result of the second subtractor with the second threshold value.

12. The device of claim 11, wherein one of the two 3D chrominance signals is obtained from the first field and the third field, and the other one of the two 3D chrominance signals is obtained from the third field and a fifth field.

13. The device of claim 12, wherein the first field, the third field, and the fifth field are NTSC standard or PAL standard.

14. The device of claim 9, wherein the chrominance judgment unit further comprises a carrier frequency observation unit for judging whether the 3D luminance signal and a next 3D luminance signal have a phase difference of 180 degrees.

15. The device of claim 9, wherein the frequency range with respect to the carrier frequency of the chrominance component is adjustable.

16. A device for outputting a luminance signal in an image processing system, a composite video signal of a frame having a chrominance component and a luminance component, wherein a 3D (three dimensional) comb filter receiving the composite video signal of the frame and outputting a 3D luminance signal based on the luminance component, and wherein the chrominance component being modulated onto a carrier frequency, the device comprising:
a field observation unit, comprising:
a value comparison unit, judging whether a difference value between a maximum value in an N-point cycle of a first field and a maximum value in an N-point cycle of a third field or a difference value between a minimum value in the N-point cycle of the first field and a minimum value in the N-point cycle of the third field is greater than a threshold value, wherein N is a positive integer; and
an edge area detection unit, judging whether the first field is in an edge of the frame; and
an output unit, outputting the 3D luminance signal, of which a component within a frequency range with respect to the carrier frequency of the chrominance component is notch filtered, when at least one of the difference value of the maximum values and the difference value of the minimum values in the N-point cycles of the first and third field is greater than the threshold value, and a detection result of the edge area detection unit is false, or outputting the 3D luminance signal when the difference value of the maximum values in the N-point cycles of the first and third field is lower than the threshold value, the difference value of the minimum values in the N-point cycles of the first and third field is lower than the threshold value, or a detection result of the edge area detection unit is true.

17. The device of claim 16, wherein the value comparison unit comprises:
a value determination unit, determining the difference value between the maximum value in the N-point cycle of the first field and the maximum value in the N-point cycle of the third field and the difference value between the minimum value in the N-point cycle of the first field and minimum value in the N-point cycle of the third field; and
a comparator, comparing the difference value of the maximum value in the N-point cycle of the first field and the maximum value in the N-point cycle of the third field with the threshold value and the difference value of the minimum value in the N-point cycle of the first field and the minimum value in the N-point cycle of the third field with the threshold value.

18. The device of claim 16, wherein the frequency range with respect to the carrier frequency of the chrominance component is adjustable.

* * * * *